(12) United States Patent
Diamante (10) Patent No.: US 10,272,988 B2
(45) Date of Patent: Apr. 30, 2019

(54) WING FOLD MECHANISM (71) Applicant: Richard G. Diamante, Long Beach, CA (US)

(72) Inventor: Richard G. Diamante, Long Beach, CA (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 587 days.

(21) Appl. No.: 14/973,259

(22) Filed: Dec. 17, 2015

(65) Prior Publication Data
US 2017/0174314 A1 Jun. 22, 2017

(51) Int. Cl.
B64C 3/56 (2006.01)

(52) U.S. Cl.
CPC .................... B64C 3/56 (2013.01)

(58) Field of Classification Search
CPC .............. B64C 3/56; B64C 3/38; B64C 3/42
See application file for complete search history.

(56) References Cited

U.S. PATENT DOCUMENTS

| 1,484,093 | A | 2/1924 | Soss |
| 1,984,092 | A | 12/1934 | Soss |
| 2,290,850 | A | 7/1942 | Umschweif |
| 6,260,799 | B1 | 7/2001 | Russ |
| 9,415,857 | B2 * | 8/2016 | Fox ...................... B64C 23/072 |
| 9,868,517 | B2 * | 1/2018 | McMahon ............ B64C 23/065 |

FOREIGN PATENT DOCUMENTS

GB 635259 A * 4/1950 .............. B64C 3/56

* cited by examiner

Primary Examiner — Brian M O'Hara
(74) Attorney, Agent, or Firm — Tarolli, Sundheim, Covell & Tummino LLP (57) ABSTRACT An aircraft with a wing assembly includes a wing extending from the aircraft along a span wise centerline and having a first and second portions that define an interior space. A wing fold mechanism includes at least one linkage that connects the first portion to the second portion. An actuator is connected to the at least one linkage for moving the second portion relative to the first portion. The second portion is movable between a folded condition extending at an angle relative to the first portion and a deployed condition coextensive with and abutting the first portion to form a seam that completely encircles the span wise centerline so as to completely enclose the wing fold mechanism within the interior space.

16 Claims, 12 Drawing Sheets

WING FOLD MECHANISM

TECHNICAL FIELD

The present disclosure relates generally to aircraft wings and, more specifically, relates to a wing fold mechanism for an aircraft that is completely hidden within the wing airfoil when the wing is deployed.

BACKGROUND

Many modern day aircraft, especially military aircraft, are equipped with wings having sections that are folded between a spread or deployed position where the aircraft is operational and a folded or stored position that allows the aircraft to be stored in a space efficient manner. Examples of such aircraft include missiles that have folding wing sections to allow storage in a launch canister and carrier based airplanes that must fold their wings for compact storage on and below the carrier deck.

SUMMARY

One embodiment includes an aircraft with a wing assembly includes a wing extending from the aircraft along a span wise centerline and having a first and second portions that define an interior space. A wing fold mechanism includes at least one linkage that connects the first portion to the second portion. An actuator is connected to the at least one linkage for moving the second portion relative to the first portion. The second portion is movable between a folded condition extending at an angle relative to the first portion and a deployed condition coextensive with and abutting the first portion to form a seam that completely encircles the span wise centerline so as to completely enclose the wing fold mechanism within the interior space.

Another embodiment includes a wing fold mechanism for an aircraft having a wing that extends along a span wise centerline and includes first and second portions that cooperate to define an interior space. The wing fold mechanism includes at least one linkage for connecting the first portion to the second portion. An actuator is connected to the at least one linkage for moving the second portion relative to the first portion. The second portion is movable between a folded condition extending at an angle relative to the first portion and a deployed condition coextensive with and abutting the first portion to form a seam that completely encircles the span wise centerline so as to completely enclose the wing fold mechanism within the interior space.

Another embodiment includes a method of folding and unfolding a wing of an aircraft having first and second portions and extending from the aircraft along a span wise centerline includes providing a wing fold mechanism. The wing fold mechanism includes at least one linkage and an actuator connected to at least one linkage. The at least one linkage is connected to the first portion and the second portion. The actuator is actuated to rotate the at least one linkage and move the second portion from a folded condition extending at an angle relative to the first portion to a deployed condition coextensive with and abutting the first portion to form a seam that completely encircles the span wise centerline so as to completely enclose the wing fold mechanism within the interior space.

DETAILED DESCRIPTION

FIGS. 1-4 illustrate an example aircraft 20 having a fuselage 22 extending along a centerline 24 and a pair of wings 26 each extending along a span wise centerline 28 away from the centerline 24. The span wise centerline 28 extends within the wing 26 and along the sweep angle of the wing. Each wing 26 includes a first portion 30 fixed directly to the fuselage 22 and a second portion 40 connected to the first portion by a wing fold mechanism 60. The wing fold mechanism 60 and wing portions 30, 40 of each wing 26 cooperate to form a wing assembly.

The first portion 30 includes a top 35 and bottom 36 that cooperate to define a portion of an outer surface 32. The second portion 40 includes a top 46 and bottom 47 that cooperate to define another portion of the outer surface 32. The collective outer surface 32 encloses an interior 34 of the wing 26 and defines the airfoil of the wing.

Figure 1:
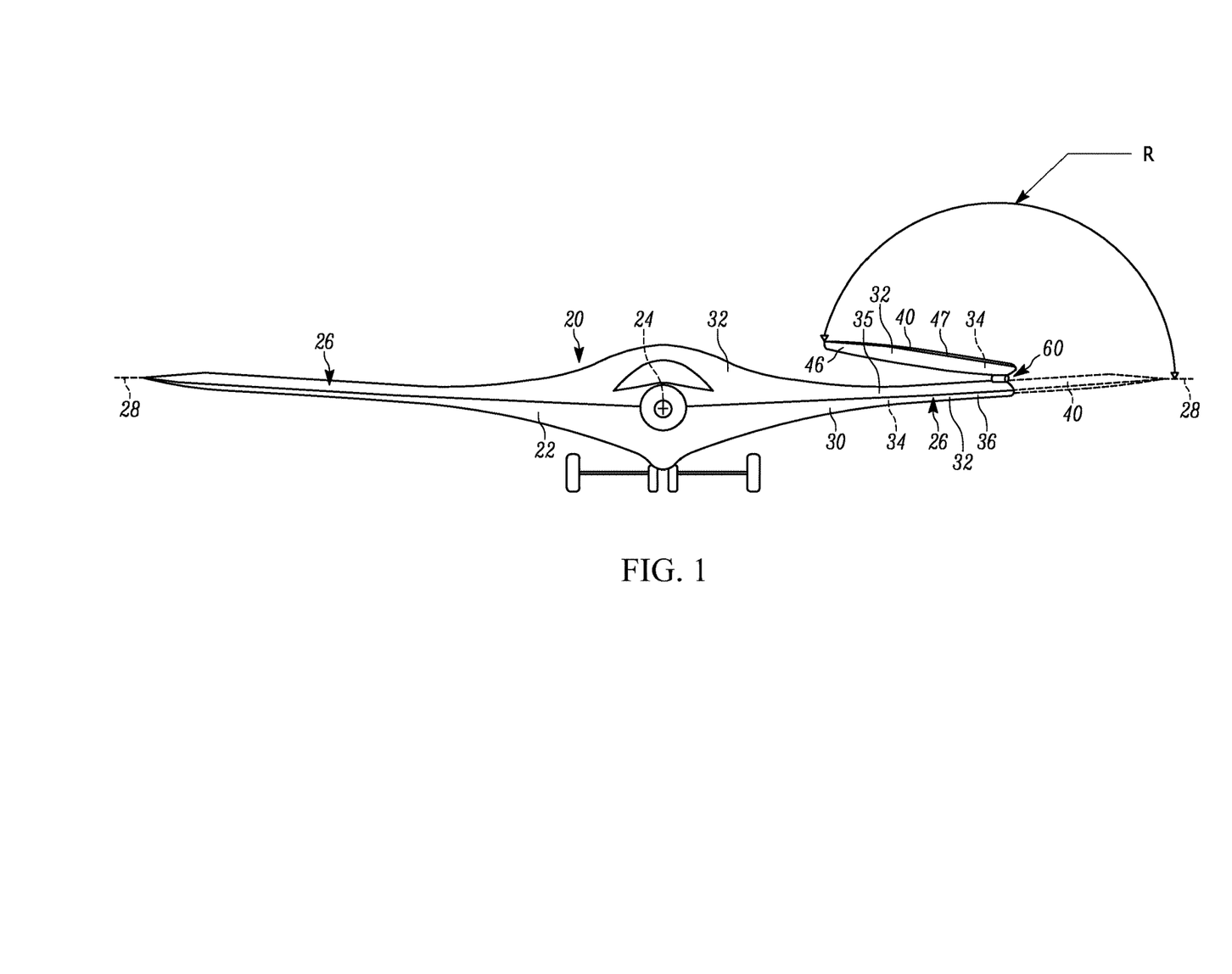
FIG. 1 illustrates an aircraft having an example wing fold mechanism.

The second portion 40 is movable relative to the first portion 30 in the direction R between a first or folded condition (illustrated in solid lines in FIG. 1) and a second or deployed condition (illustrated in phantom lines in FIG. 1). The second portion 40 is placed in the folded condition during taxiing, transit or storage or otherwise when it is desirable to reduce the footprint of the aircraft 20. The second portion 40 is placed in the deployed condition during takeoff and flight.

Figure 2:
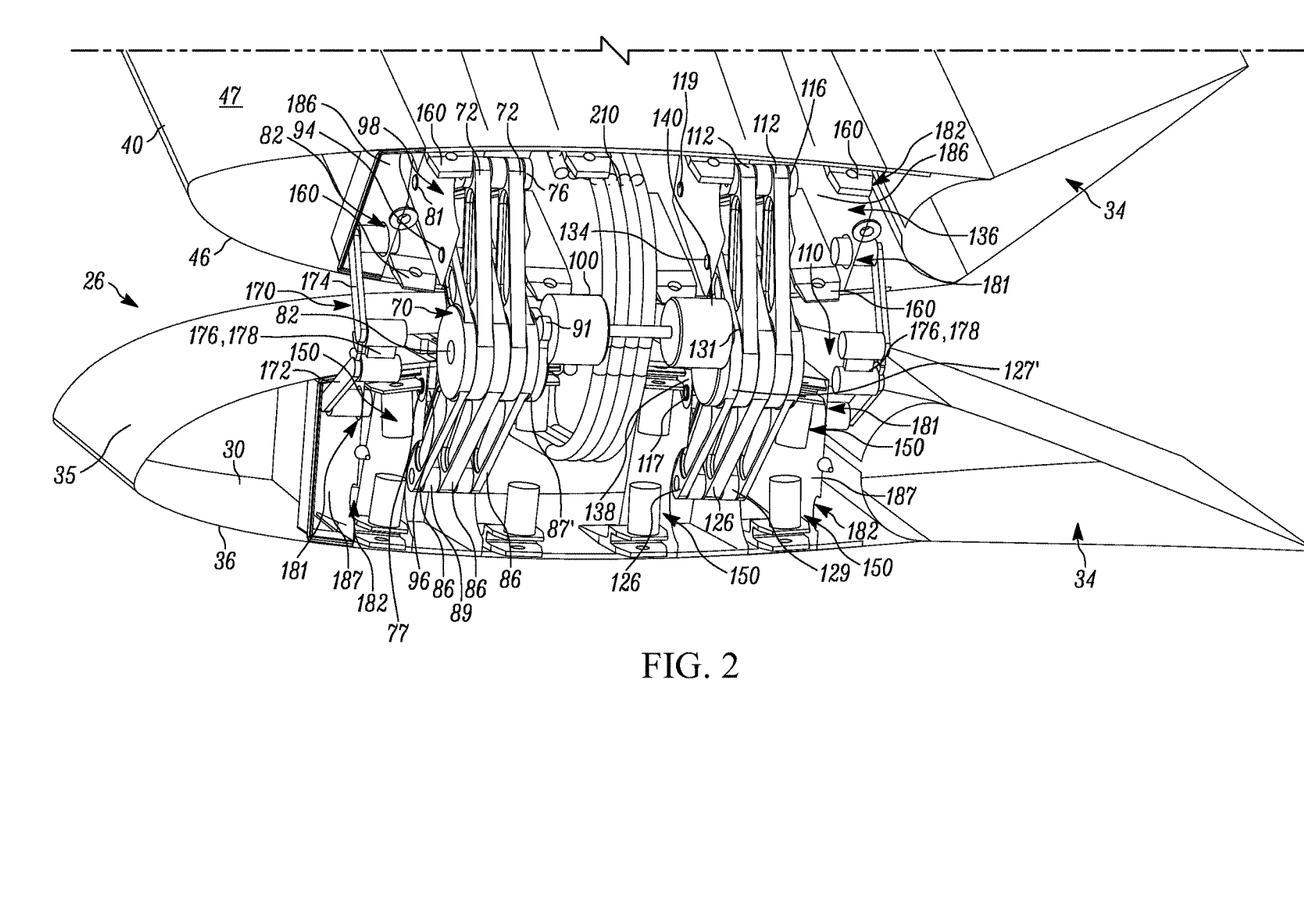
FIG. 2 illustrates an enlarged view of the wing fold mechanism of FIG. 1.
Figure 3:
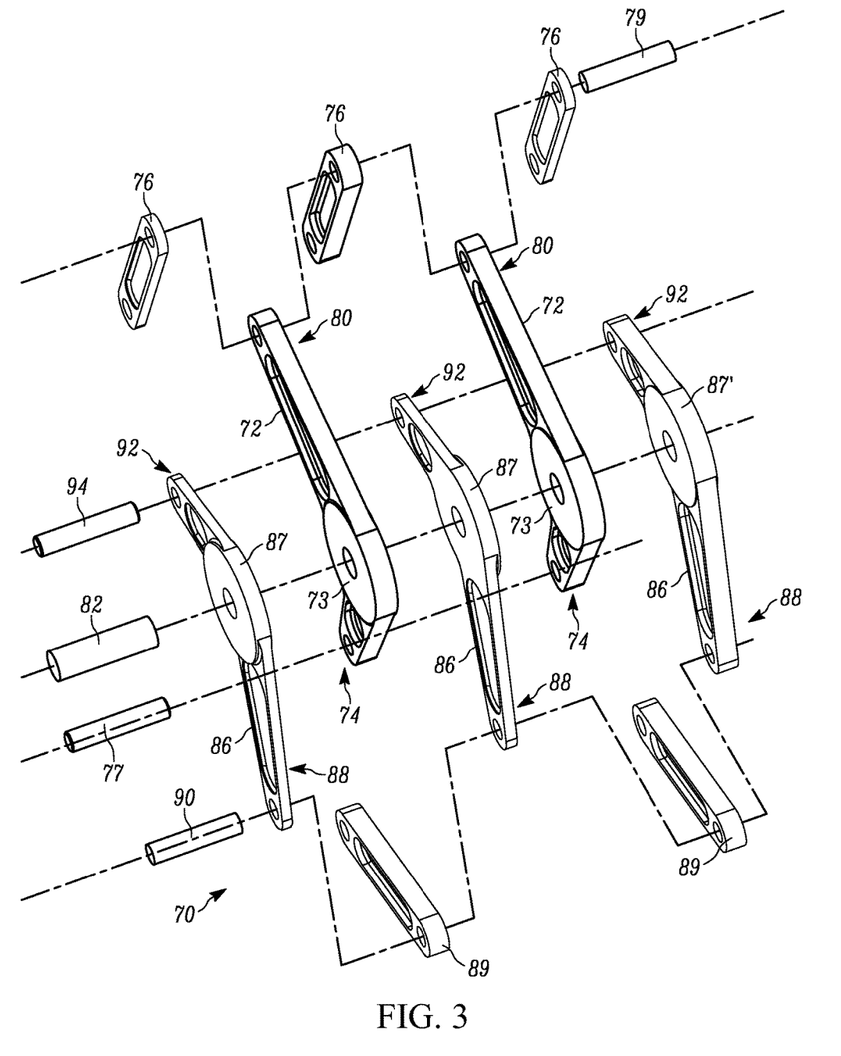
FIG. 3 illustrates an exploded view of the wing fold mechanism of FIG. 2.

Referring to FIGS. 2-3, the wing fold mechanism 60 includes one or more linkages 70, 110 for helping to move the second portion 40 relative to the first portion 30. As shown, the wing fold mechanism 60 includes one first linkage 70 and one second linkage 110. It will be appreciated, however, that the wing fold mechanism 60 can include more or less of each linkage.

The first linkage 70 includes at least one first arm 72 and at least one second arm 86. In the example shown, the first linkage 70 includes two first arms 72 and three second arms 86 arranged in an alternating stack. Each first arm 72 is generally L-shaped and extends between a pair of ends 74, 80. A hub 73 is positioned between the ends 74, 80. The ends 74 are pivotably connected to the first portion 30 at an axle 77. The ends 80 are pivotably connected to hinge members 76 at axles 79. The hinge members 76 are pivotably connected to the second portion 40 at an axle 81.

The second arms 86 are positioned between and outside the first arms 72 such that each first arm is sandwiched between a pair of second arms. Each second arm 86 is generally L-shaped and extends between a pair of ends 88, 92. A hub 87 is positioned between the ends 88, 92. The ends 88 are pivotably connected to hinge members 89 at an axle 90. The hinge members 89 are pivotably connected to the first portion 30 at an axle 75.

A bracket 96 (FIG. 4) secured to the top 35 of the first portion 30 is configured to rotatably receive each of each axle 75, 77 to pivotably connected the first arms 72 and hinge members 89 to the first portion 30. Brackets 98 extend between the top 46 and bottom 47 of the second portion 40 and are configured to rotatably receive each of the axles 81, 94 to pivotably connect the second arms 86 and the hinge members 76 to the second portion.

It will be appreciated that only the first linkage 70 is discussed in the interest of brevity but the second linkage 110 is substantially identical to the first linkage, with features in the second linkage having reference numbers that are 40 higher than the corresponding features in the first linkage 70, e.g., the first and second arms 72, 86 of the first linkage 70 correspond with first and second arms 112, 126 in the second linkage 110. Consequently, the second linkage 110 also includes a stack of alternating arms 112, 126, hinge members 116, 129, and axles 117, 119, 130, 134 connected to the tops 35, 46 of the first and second portions 30, 40 of the wing 26 by respective brackets 136, 138 (see FIGS. 2 and 4).

Referring to FIG. 2, a first rotary gear actuator (not shown) is incorporated into the stacked assemblage of alternating hubs 73, 87. The input shaft 82 of the RGA extends thru the hubs 73, 87. A drive motor 100 is provided for powering the first rotary geared actuator. to rotate the first linkage 70. Similarly, a second rotary gear actuator (not shown) is incorporated into the stacked assemblage of alternating hubs 113, 127. The input shaft 122 of the RGA extends thru the hubs 113, 127. A drive motor 140 is provided for powering the second rotary geared actuator to rotate the second linkage 110. A shaft 101 interconnects the motors 100, 140 for synchronization. The output shaft of the motor 100 is geared to the input shaft 82 of the RGA via a gear casing 91 containing spur gears (not shown). The output shaft of the motor 140 is geared to the input shaft 122 of the RGA via a gear casing 131 containing spur gears (not shown). The motor output/interconnect shafts 101 are offset from the RGA input shafts 82, 122 connecting the arms 72, 86 and 112, 126, respectively.

Since the arms 72 or 86 geared to the input shaft 82 are connected to the first and second portions 30, 40 through the axles 77, 79 or 90, 94, respectively, rotation of the drive motor 100 results in relative movement between the first and second portions. The remaining arms 72 or 86 are secured to the first and second portions 30, 40 at the axles 77, 79 or 90, 94, respectively, and, thus, moving the first and second portions relative to one another causes all the arms 72, 86 to rotate relative to one another.

Similarly, since the arms 112 or 126 geared to the input shaft 122 are connected to the first and second portions 30, 40 through axles 117, 119 or 130, 134, respectively, rotation of the drive motor 140 results in relative movement between the first and second portions. The remaining arms 112 or 126 are secured to the first and second portions 30, 40 at the axles 117, 119 or 130, 134, respectively, and, thus, moving the first and second portions 30, 40 relative to one another also causes all the arms 112, 126 to rotate relative to one another. It is therefore clear that all the arms 72, 86, 112, 126—whether directly rotated by the drive motors 100, 140 or indirectly rotated in response thereto—cooperate to move the second portion 40 relative to the first portion 30. It will be appreciated that although a pair of drive motors 100, 140 are used to move the portions 30, 40 relative to each other a single drive motor (not shown) could alternatively be used.

Figure 4:
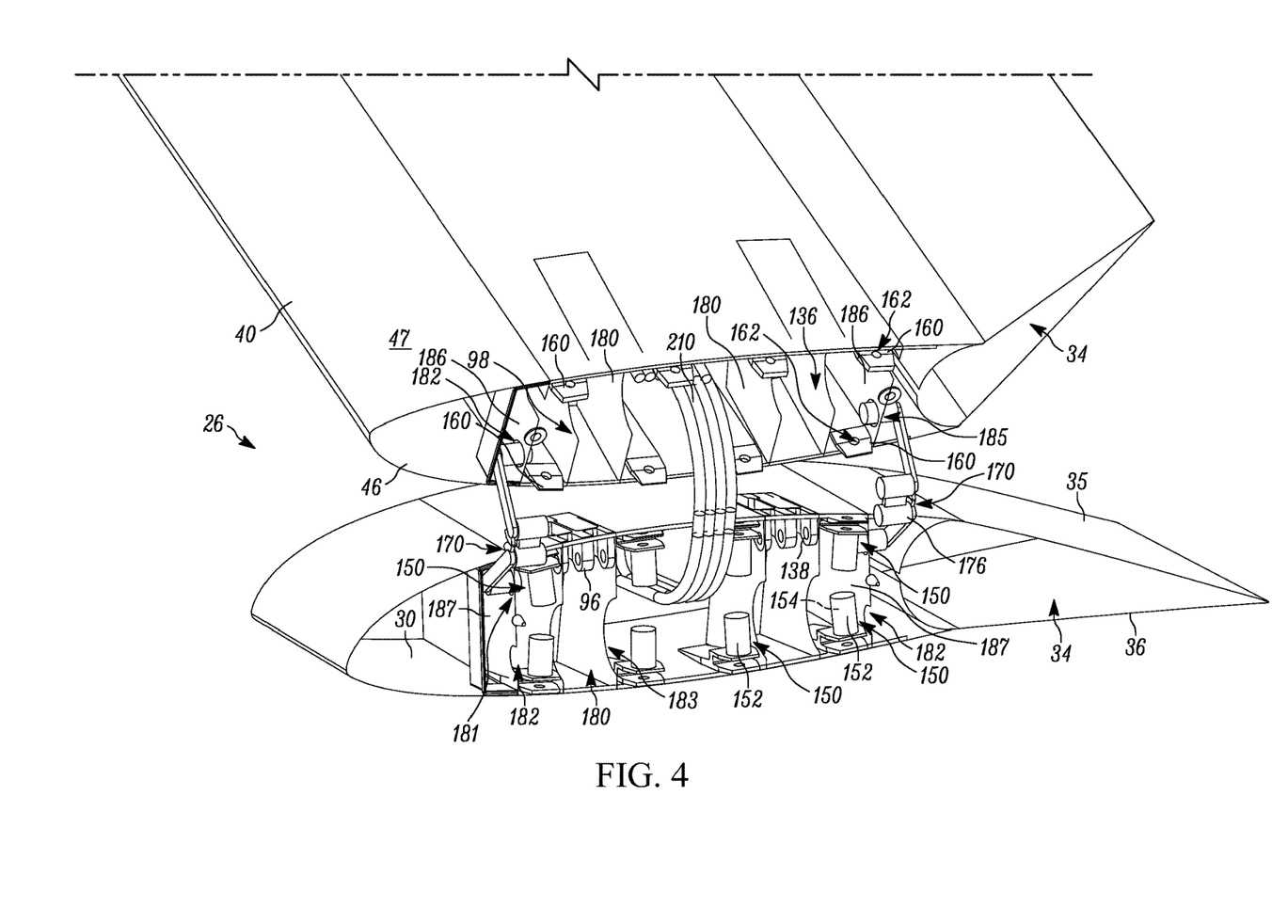
FIG. 4 illustrates an enlarged view of FIG. 1 with some components removed.

As shown more clearly in FIG. 4, the first and second wing portions 30, 40 include cooperating structures 150, 160 for aligning and fixing the portions 30, 40 when the second portion is in the deployed condition. In one example, a series of clevis members 150 is positioned along the top 35 and the bottom 36 of the first portion 30 within the interior space 34. Alternatively, the clevis members 150 can be positioned along only one of the top 35 and bottom 36 (not shown). Each clevis member 150 has a U-shaped receptacle and includes an actuator 152 with a retractable/extendable lock pin (indicated in phantom at 154).

A series of projections 160 is positioned along the top 46 and bottom 47 of the second portion 40. The number and location of the projections 160 on the second portion 40 corresponds with the number and location of the clevis members 150 on the first portion 30. As shown, each projection 160 has a planar configuration and is configured to be received in the receptacle on a corresponding clevis member 150. Each projection 160 includes an opening 162 for receiving the lock pin 154 on one of the actuators 152. The wing fold mechanism 60 is configured such that the projections 160 mate with the clevis members 150 when the second portion 40 reaches the deployed condition aligned axially with the first portion 30. Each clevis member 150 and projection 160 can be configured to account for any movement of the virtual hingeline as the second portion 40 moves to the deployed condition. One or more hydraulic swivels 170 positioned outside both linkages 70, 110 help route hydraulic fluid between the first portion 30 and the second portion 40. In one example, the hydraulic swivels 170 constitute a pair of geared, hydraulic quad swivels 170 connected to panels 187 on the first portion 30 and panels 186 on the second portion 40. Each panel 187 on the first portion 30 extends between the top 35 and bottom 36 of the first portion and includes an opening 181 and a notch 182. Each panel 186 on the second portion 40 extends between the top 46 and bottom 47 of the second portion and also includes an opening 181 and a notch 182.

One end of each hydraulic swivel 170 is rotatably supported in the opening 181 in one of the panels 187. The other end of each hydraulic swivel 170 is rotatably supported in the opening 181 in one of the panels 186. The ends of the hydraulic swivels 170 pivot relative to one another through when the second portion 40 moves relative to the first portion 30.

A series of brackets 180 are provided in the first and second portions 30, 40 for capturing the leftmost and rightmost hubs 87, 127 on each linkage 70, 110 when the second portion 40 reaches the deployed condition. Each bracket 180 includes a pair of panels positioned on the opposite side of each linkage 70, 110 in both portions 30, 40 of the wing 26. Each panel in each bracket 180 includes a notch 183.

FIGS. 5A-5D illustrate operation of the wing fold mechanism 60 to transition the second portion 40 from the folded condition to the deployed condition. It will be appreciated that although only one wing 26 is shown having the wing fold mechanism 60 both wings could likewise utilize a wing fold mechanism 60 to deploy/fold both second portions 40.

Figure 5A:
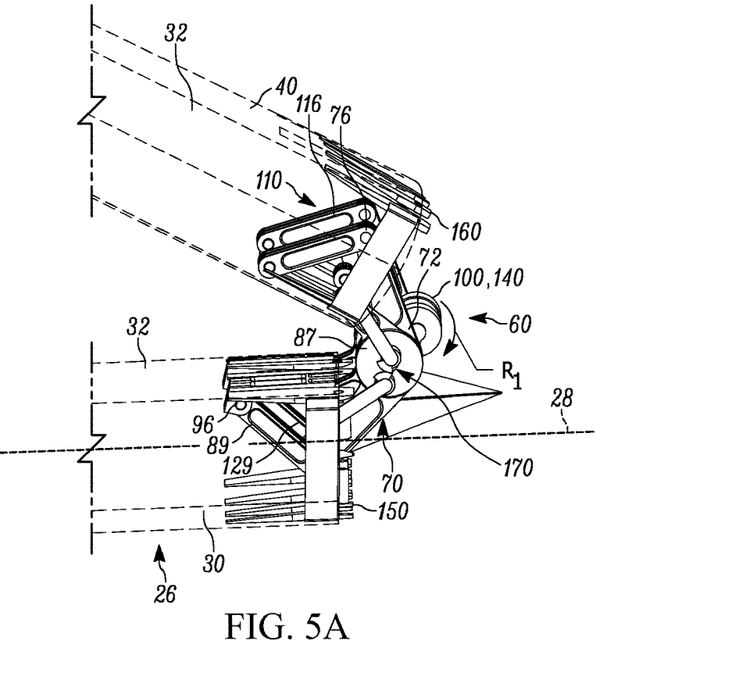
FIGS. 5A-5D illustrate movement of the aircraft wing to a deployed condition.

In the initial state shown in FIG. 5A, the second portion 40 is in the folded condition retracted out of alignment with the first portion 30 to a position overlying the first portion. In one example, the angle between the first and second portions 30, 40 in the folded condition can be about 150°. This angle, however, could be closer to 180°, if desired. The folded condition is utilized when space around the aircraft 20 is limited or reduced, e.g., during taxiing or storage of the aircraft. The motors 110, 140, when unactuated, resist relative movement between the arms 72, 86 and relative movement between the arms 112, 126 to maintain the second portion 40 in the folded condition.

When it is desirable to deploy the wings 26, the wing fold mechanisms 60 are actuated. More specifically, the drive motors 100, 140 are actuated to rotate the input shafts 82, 122 connected thereto in the direction indicated by the arrow $R_1$. This rotation causes the second portion 40 to rotate in the direction $R_1$ due to the aforementioned kinematic connection between the linkages 70, 110 and the wing portions 30, 40. The brackets 96, 138, 180, 186, 187 collectively help secure the linkages 70, 110 to the wing 26 and help transfer loads from the axles 75, 77, 81, 94, 117, 119, 134 into the first and second portions 30, 40 of the wing 26 as the wing deploys.

Figure 5B:
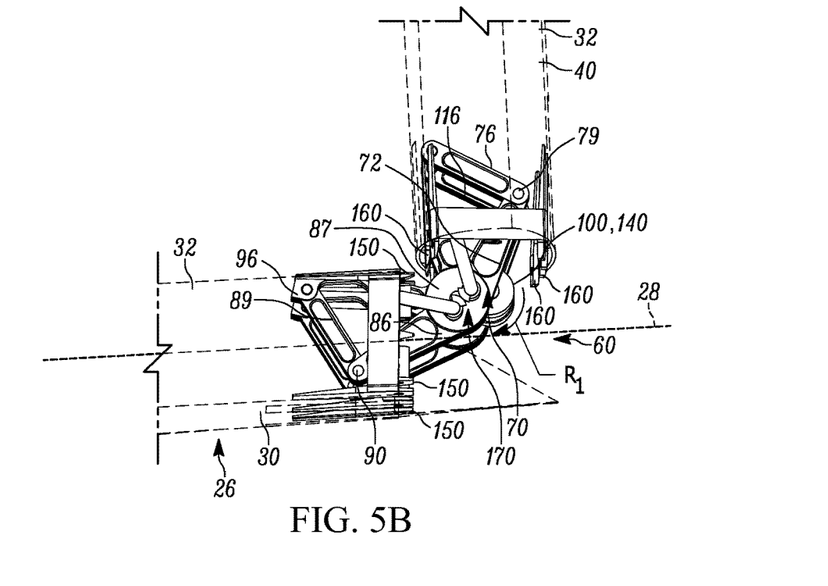

The manner in which the first and second arms 72, 86 pivot/rotate can be seen in the transition between FIG. 5A, in which the angle between the first and second portions 30, 40 is about 150°, and FIG. 5B, in which the angle between the first and second portions is about 90°. It is also evident that as the second portion 40 moves relative to the first portion 30 towards the deployed condition, the wing fold mechanism 60 begins collapsing so as to move closer to the span wise centerline 28. The linkages 70, 110 transition from a substantially vertical position in which the first and second portions 30, 40 overlie one another to a substantially horizontal position in which the first and second portions become substantially coextensive with one another.

Figure 5C:
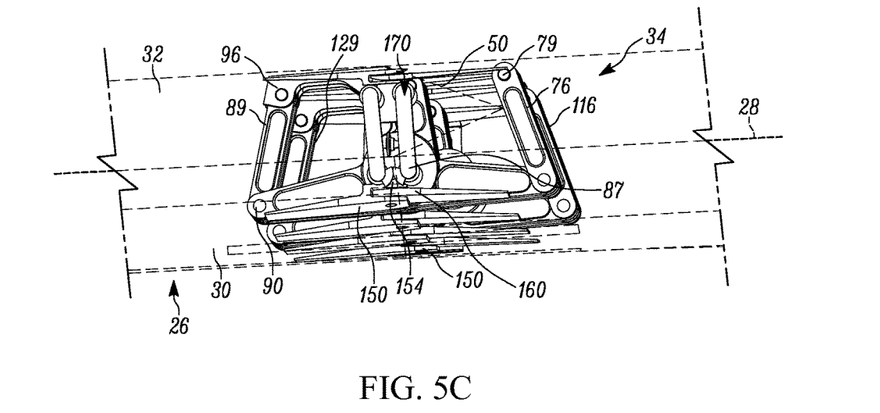
Figure 5D:
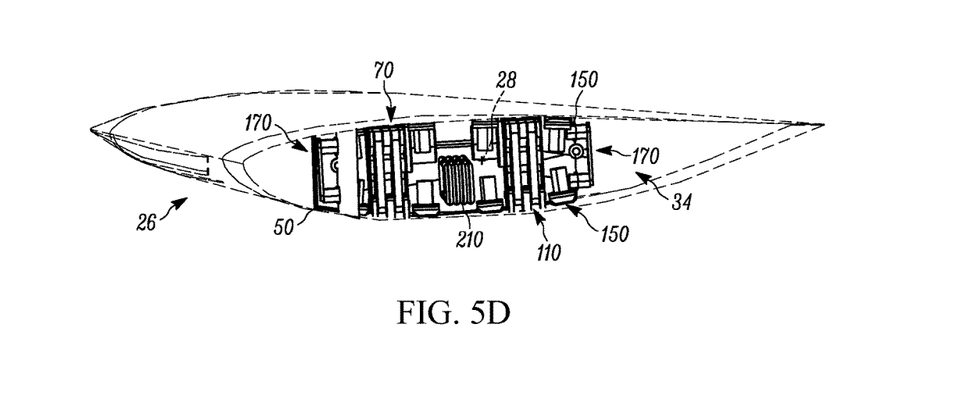

The drive motors 100, 140 continue rotating the linkages 70, 110 in the direction $R_1$ until the second portion 40 reaches the deployed condition shown in FIGS. 5C and 5D. As the second portion 40 approaches the deployed condition, the kinematics of the linkages 70, 110 are configured such that the projections 160 on the second portion 40 follow a path that automatically places them into alignment with the passages in the clevis members 150. In one example, the projections 160 on the second portion 40 move along a generally arcuate or elliptical path into proximity with the corresponding clevis members 150 on the first portion 30.

The projections 160 and clevis members 150 are configured such that the pins 154 on the actuating members 152 are automatically aligned with the openings 162 in the projections when the second portion 40 abuts the first portion 30 (FIGS. 5C-5D). The pins 154 are then actuated into the openings 162, which prevents relative movement between the first and second portions 30, 40 and maintains the portions in a coextensive orientation generally along the span wise centerline 28. In other words, actuating the pins 154 locks the second portion 40 in the deployed condition.

The linkages 70, 110 of the wing fold mechanism 60 are advantageously configured to be stowed entirely within the airfoil/outer surface 32 of the wing 26 when the second portion 40 is in the deployed condition. As shown in FIGS. 5C-5D, the linkages 70, 110 automatically position themselves entirely within the wing airfoil 32 while moving the second portion 40 towards the deployed condition due to the placement and kinematics of the linkages within the interior 34 of the wing 26.

When the second portion 40 is in the deployed condition, the first and second portions 30, 40 are co-extensive and abut one another along a continuous seam 50 (FIGS. 5C-5D) that extends entirely around the span wise centerline 28 of the wing 26, i.e., the seam is continuous about the span wise centerline. The first and second portions 30, 40 completely enclose the wing fold mechanism 60 without the need for non-planar seams or supplemental enclosing structures, e.g., cove doors. This is advantageous in that the airfoil of the wing 26 is undisturbed and unaltered by the addition of the wing fold mechanism 60. The wing 26 can therefore be folded and deployed without affecting the performance of the aircraft 20. In particular, airflow across the airfoil is undisturbed as the outer surface 32 is continuously smooth. This is contrast to conventional cove doors which extend radially outward of the airfoil profile and create discontinuities/non-uniformity in the outer surface.

The notches 183 in the brackets 180 are sized and positioned such that when the second portion 40 reaches the deployed condition the notches provide clearance for the rotating leftmost and rightmost hubs 87 of the first linkage 70 (as viewed in FIG. 4) and leftmost and rightmost hubs 127 of the second linkage 110. The notches 182 in the brackets 186, 187 can be configured such that when the second portion 40 reaches the deployed condition the notches enclose the bearings 176, 178 for each hinge 170. By enclosing the bearings 126, 128 and hubs 87, 127 the notches 182, 183 help prevent undesirable relative movement between the first and second portions 30, 40 due to vibration, etc., and thereby help maintain a continuous seam 50 and uninterrupted airfoil 32. When it is desirable to return the second portion 40 to the folded condition, the process described above is simply reversed. First, the actuators 152 retract the pins 154 out of the openings 162 in the projections 160, which allows for relative movement between the first and second portions 30, 40. Then, the drive motors 100, 140 are rotated in the direction opposite the direction $R_1$, which drives the hubs 87' 127' to remove the projections 160 from the clevis members 150. Continued rotation in the direction opposite $R_1$ moves the second portion 40 out of alignment with the first portion 30 and eventually into the substantially overlying position shown in FIG. 5A. As this occurs, the bearings 126, 128 pivot about another.

FIGS. 6-10 illustrate further examples of wing fold mechanisms 260, 300, 400, 500 for moving the second portion 40 between the folded and deployed conditions in a manner that provide the same continuous seam 50 about the span wise centerline 28 as the wing fold mechanism 60 by collapsing/positioning themselves entirely within the airfoil 32 of the wing 26. In FIGS. 6-10, features that are identical to features in the wing fold mechanism 60 of FIGS. 1-5D have the same reference number.

Figure 6:
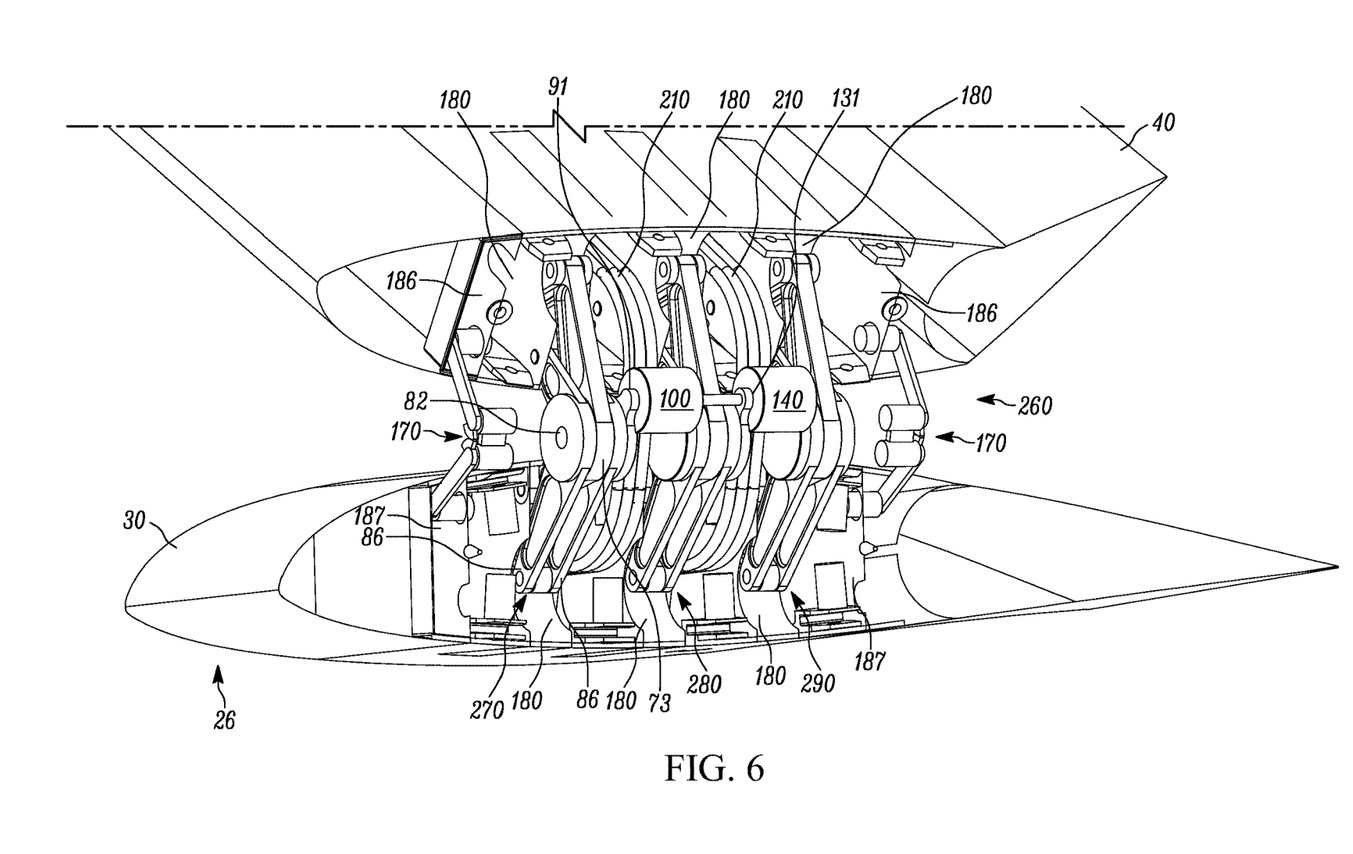
FIG. 6 illustrates another example wing fold mechanism.

In FIG. 6, the wing fold mechanism 260 includes three linkages 270, 280, 290, which are similar to the linkages 70, 110 but include a different number of arms. More specifically, each linkage 270, 280, 290 includes one first arm 73 positioned axially between a pair of second arms 86. The arms 73, 86 are connected to the first and second portions 30, 40 in the same way the arms in the first and second linkages 70, 110 are connected to the first and second portions. The wing fold mechanism 260 further includes a commensurate number of panels 180 on each portion 30, 40 to accommodate the hubs 87 in each linkage 270, 280, 290. The wing fold mechanism 260 operates in substantially the same way as the wing fold mechanism 60, i.e., the drive motors 100, 140 rotate the hubs connected thereto to move the second portion 40 between the deployed condition and the folded condition. It will be understood that although FIG. 6 illustrates two drive motors 100, 140 more or fewer drive motors can be directly connected to any number of linkages 270, 280, 290 to move the second portion 40 between the folded and deployed conditions.

Figure 7:
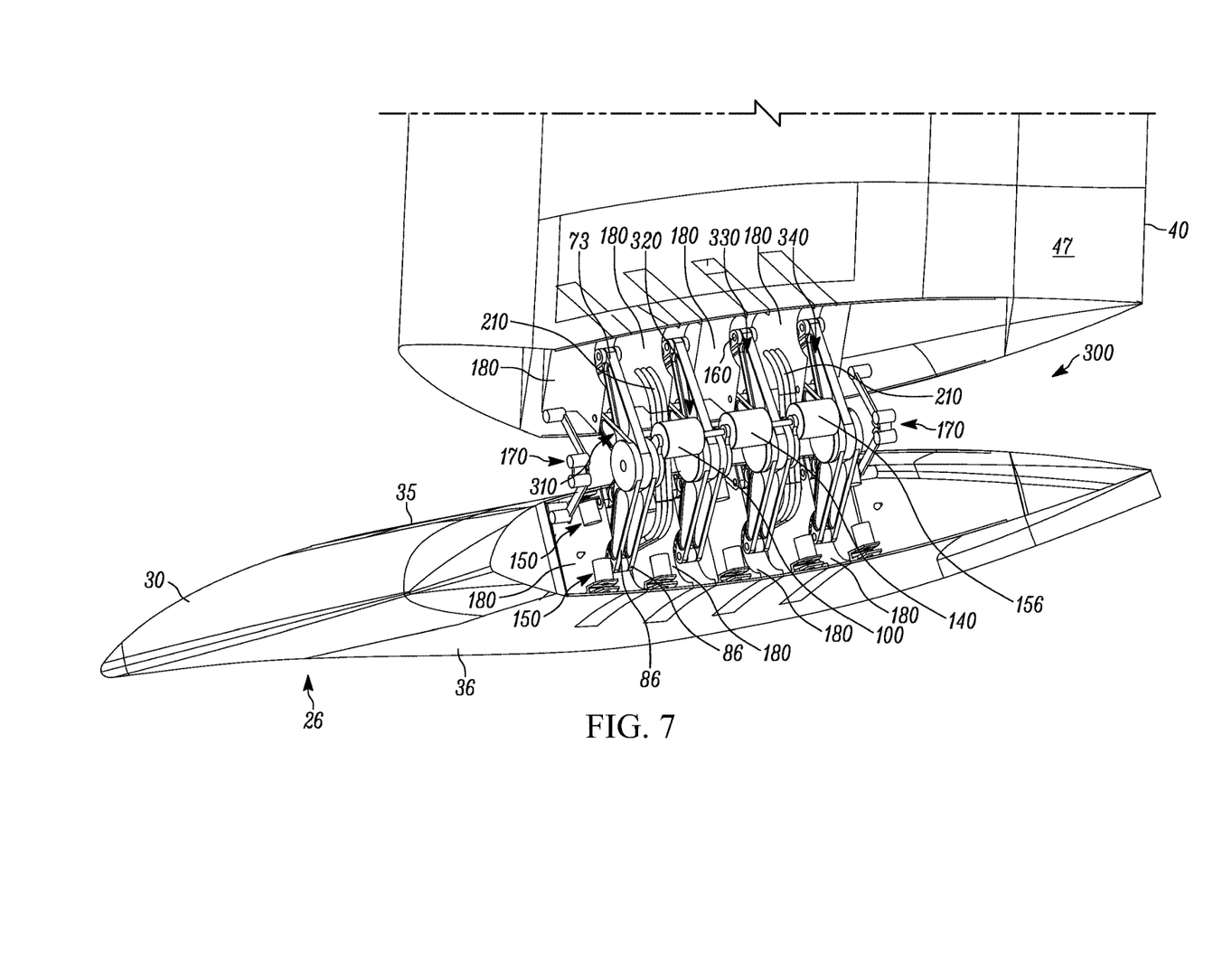
FIG. 7 illustrates yet another example wing fold mechanism.

In FIG. 7, the wing fold mechanism 300 includes four linkages 310, 320, 330, 340 which are similar to the linkages 70, 110 but include a different number of arms. More specifically, each linkage 310, 320, 330, 340 includes one first arm 73 positioned axially between a pair of second arms 86. The arms 73, 86 are connected to the first and second portions 30, 40 in the same way the arms in the first and second linkages 70, 110 are connected to the first and second portions. The wing fold mechanism 300 further includes a commensurate number of panels 180 to accommodate the hubs in each linkage 310, 320, 330, 340. The wing fold mechanism 300 can include a third motor 156 to supplement the motors 100, 140. The third motor 156 is connected via input shaft (not shown) to one of the hubs on the linkage 330. The wing fold mechanism 300 operates in substantially the same way as the wing fold mechanism 60 except that three drive motors 100, 140, 156 rotate the hubs connected thereto to move the second portion 40 between the deployed condition and the folded condition. It will be understood that although FIG. 7 illustrates three drive motors 100, 140, 156 more or fewer drive motors can be directly connected to any number of linkages 310, 320, 330, 340 to move the second portion 40 between the folded and deployed conditions.

Figure 8:
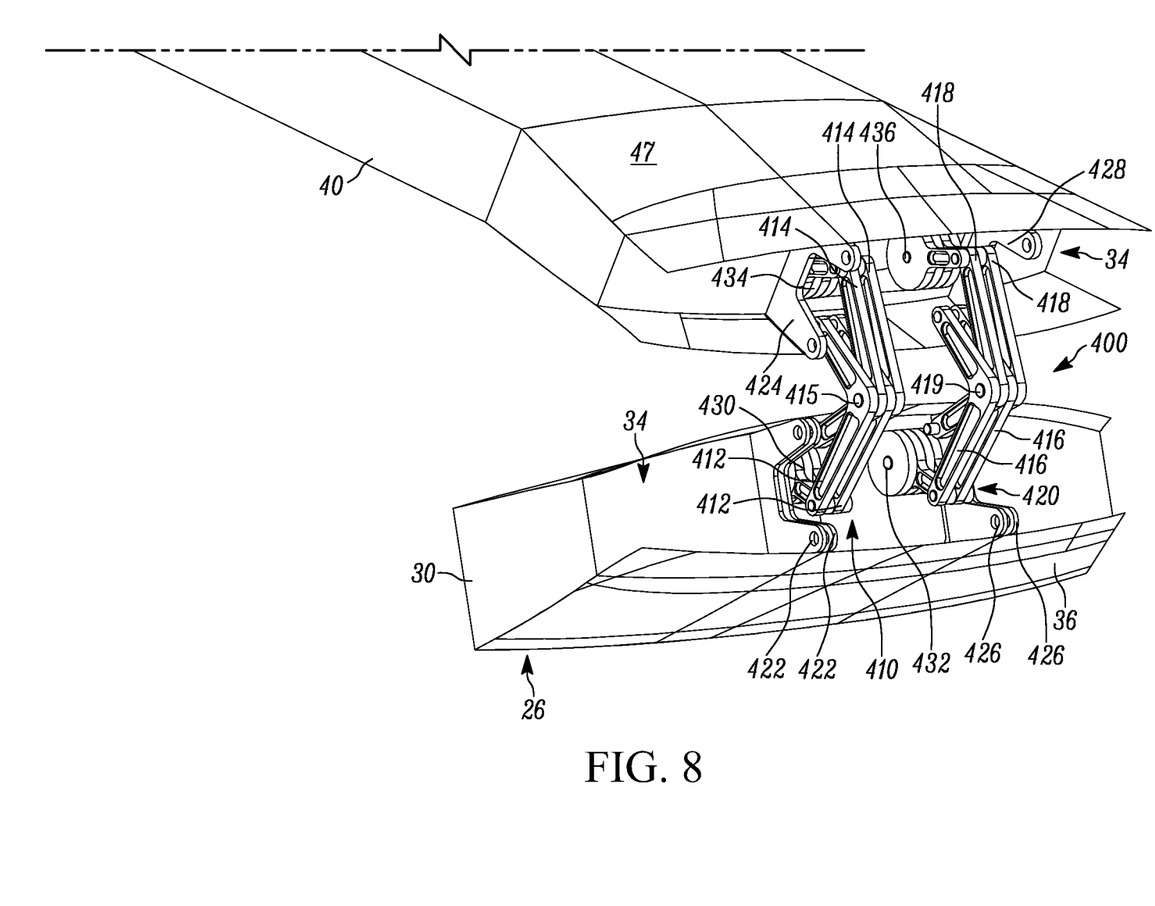
FIG. 8 illustrates yet another example wing fold mechanism.

In FIG. 8, the wing fold mechanism 400 utilizes a pair of linkages 410, 420 which are each rotatable by a series of rotary actuators 430, 432, 434, 436 to move the first and second portions 30, 40 relative to each other. The rotary actuators 430, 432 are provided within and secured to the first portion 30. The rotary actuators 434, 436 are provided within and secured to the second portion 40. The first linkage 410 includes a pair of first arms 412 and a pair of second arms 414. Each first arm 412 has one end secured to the rotary actuator 430 and another end secured to the other first arm 412. Each second arm 414 has one end secured to the rotary actuator 434 and another end secured to the other second arm 414. The arms 412, 414 are rotatably connected to each other by an axle 415. A pair of spaced-apart brackets 422 are provided adjacent the rotary actuator 430 within the first portion 30. A single bracket 424 is provided adjacent the rotary actuator 434 within the second portion 40.

The second linkage 420 includes similarly includes a pair of first arms 416 and a pair of second arms 418. Each first arm 416 has one end secured to the rotary actuator 432 and another end secured to the other first arm 416. Each second arm 418 has one end secured to the rotary actuator 436 and another end secured to the other second arm 418. The arms 416, 418 are rotatably connected to each other by an axle 419. A pair of spaced-apart brackets 426 are provided adjacent the rotary actuator 432 within the first portion 30. A single bracket 428 is provided adjacent the rotary actuator 436 within the second portion 40.

The rotary actuators 430, 432, 434, 436 are actuated to move the second portion 40 relative to the first portion 30 between the folded condition and the deployed condition. When the second portion 40 moves to the deployed condition 30, the brackets 424, 428 move to a position between the corresponding brackets 422, 426. Locking pins (not shown) are then engaged into the now aligned holes in brackets 422, 424, 426, 428 thereby structurally locking the second portion 40 to the first portion 30 in the extended, flightworthy position. This maintains the continuous seam 50 (not shown) in a manner similar to the cooperating structure 150, 160 in the wing fold mechanism 60. It will be understood that although FIG. 8 illustrates four rotary actuators 430, 432, 434, 436 more or fewer rotary actuators can be connected to any number of linkages 410, 420 to move the second portion 40 between the folded and deployed conditions.

Figure 9A:
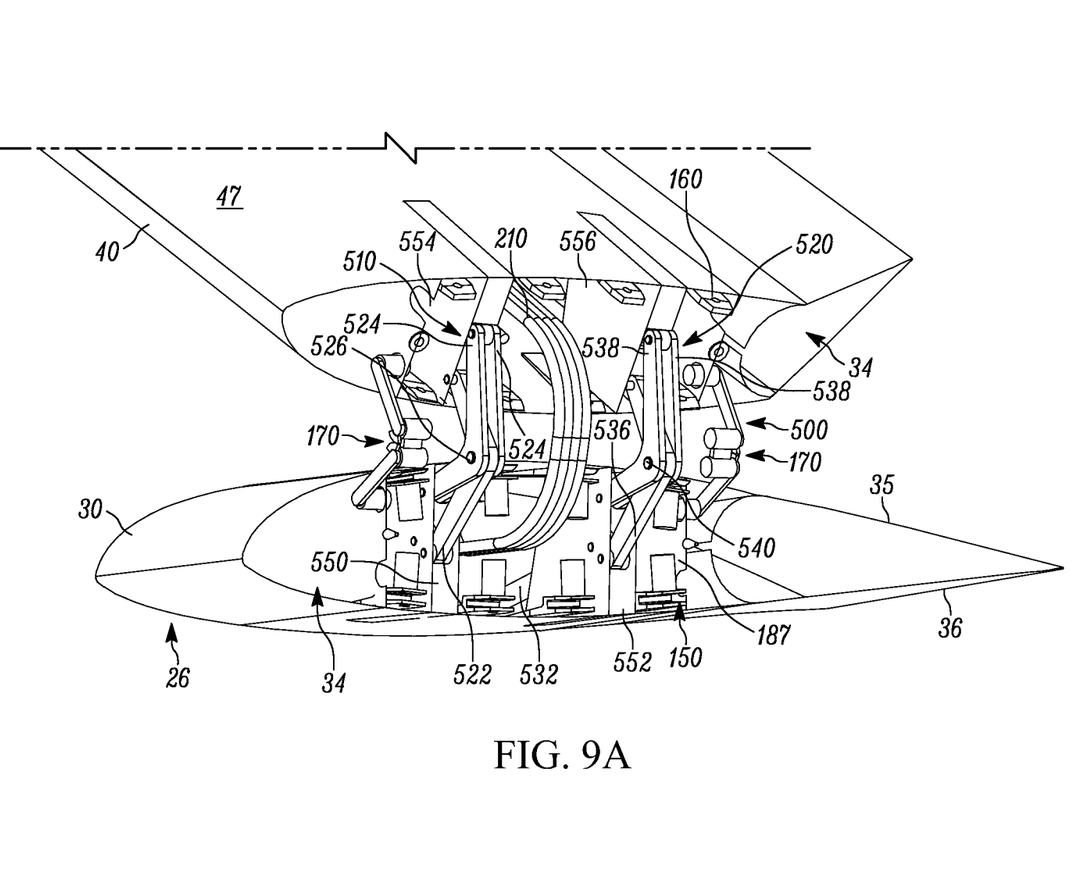
FIG. 9A illustrates yet another example wing fold mechanism.
Figure 9B:
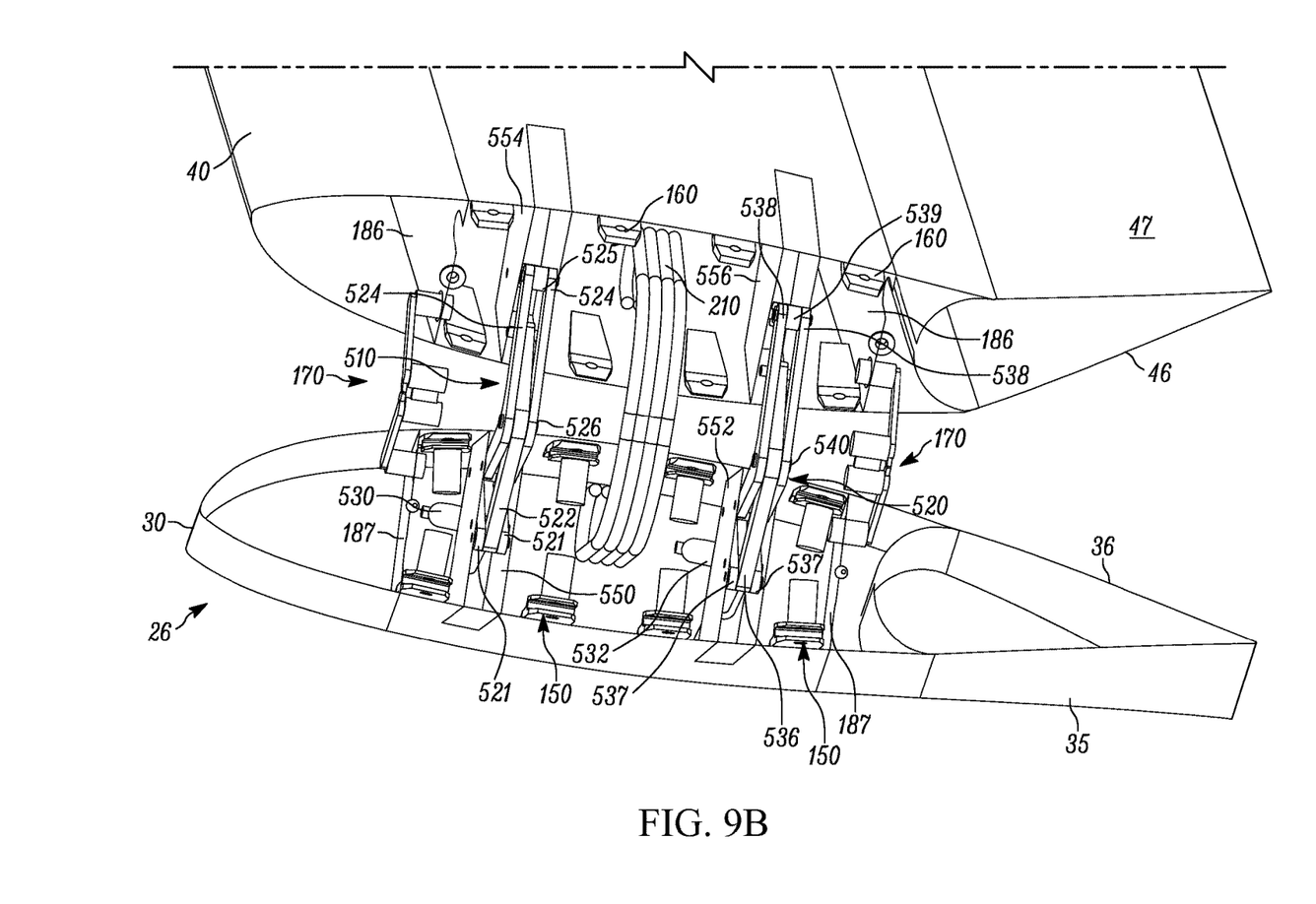
FIG. 9B illustrates a front view of FIG. 9A.
Figure 10:
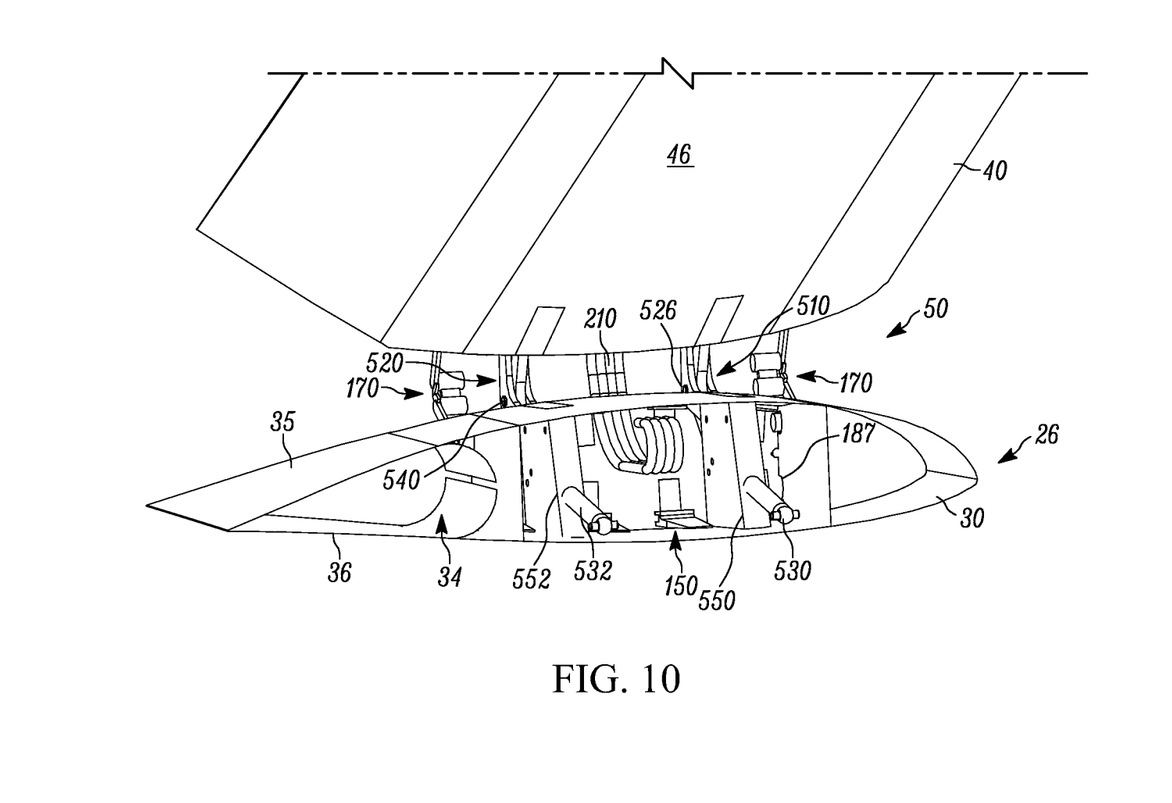
FIG. 10 illustrates a rear view of FIG. 9A.

In FIGS. 9A-10, the wing fold mechanism 500 utilizes a pair of linkages 510, 520 which are each rotatable by a respective linear actuator 530, 532 to move the first and second portions 30, 40 relative to each other. The linear actuators 530, 532 can include, for example, jack screws or hydraulic cylinders. A pair of brackets 550, 552 are secured to first portion 30 and extend between the top 35 and the bottom 36. Similarly, a pair of brackets 554, 556 are secured to the second portion 40 and extend between the top 46 and the bottom 47. Each linear actuator 530, 532 extends through one of the brackets 550, 552.

The first linkage 510 includes a first arm 522 and a pair of second arms 524. The first arm 522 has one end secured to the linear actuator 530 and rotatably secured to hinges 521, which are rotatably secured to the bracket 550. The other end of the first arm 522 is rotatably secured to and within the bracket 554. Each second arm 524 has one end rotatably secured to and within the bracket 554 and another end rotatably secured to and within the bracket 550. The arms 522, 524 are rotatably connected to each other by an axle 526.

Similarly, the second linkage 520 includes a first arm 536 and a pair of second arms 538. The first arm 536 has one end secured to the linear actuator 532 and rotatably secured to hinges 537, which are rotatably secured to the bracket 552. The other end of the first arm 536 is secured to and within the bracket 556. Each second arm 538 has one end rotatably secured to and within the bracket 556 and another end rotatably secured to and within the bracket 552. The arms 536, 538 are rotatably connected to each other by an axle 540.

The linear actuators 530, 532 are actuated to move the second portion 40 relative to the first portion 30 between the folded condition and the deployed condition. In particular, the linear actuators 530, 532 pull the first arms 522, 536 inward towards the first portion 30, which in turn pull the second arms 524, 538 inward towards the first portion. It will be understood that although FIGS. 9A-10 illustrate two linear actuators 530, 532 more or fewer linear actuators can be connected to any number of linkages 510, 520 to move the second portion 40 between the folded and deployed conditions.

What have been described above are examples of the present disclosure. It is, of course, not possible to describe every conceivable combination of components or methodologies for purposes of describing the present disclosure, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An aircraft having a wing assembly comprising:
   a wing extending from the aircraft along a span wise centerline and having first and second portions defining an interior space;
   a wing fold mechanism comprising:
      at least one linkage connecting the first portion to the second portion; and
      an actuator connected to the at least one linkage for moving the second portion relative to the first portion, wherein the second portion is movable between a folded condition extending at an angle relative to the first portion and exposing the interior space and a deployed condition coextensive with and abutting the first portion to form a seam that completely encircles the span wise centerline so as to completely enclose the wing fold mechanism within the interior space,
a plurality of brackets secured to the first and second portions, each bracket including a plurality of notches; and
a plurality of hydraulic swivels each pivotably connected to one of the brackets on the first portion and one of the brackets on the second portion, the notches cooperating to enclose a portion of each hydraulic swivel when the second portion is in the deployed condition.

2. The aircraft recited in claim 1, wherein each linkage comprises a plurality of arms rotatably connected together about an axis and pivotably connected to the first portion and the second portion.

3. The aircraft recited in claim 2 further comprising a pair of brackets secured to the first and second portions and cooperating to enclose portions of the arms when the second portion is in the deployed condition.

4. The aircraft recited in claim 1, wherein the actuator is a rotary actuator.

5. The aircraft recited in claim 1, wherein the actuator is a linear actuator.

6. The aircraft recited in claim 1 further comprising a plurality of clevis members secured to one of the first portion and the second portion and a plurality of corresponding projections secured to the other of the first portion and the second portion, the projections mating with the clevis members when the second portion is in the deployed condition.

7. The aircraft recited in claim 6, wherein each clevis member includes a second actuator having a lock pin that extends through an opening in a corresponding projection to maintain the second portion in the deployed condition.

8. The aircraft recited in claim 1, wherein each linkage comprises:
a first arm pivotably connected to the first and second portions; and
a second arm pivotably connected to the first and second portions and rotatably connected to the first arm, wherein the actuator is a linear actuator secured to the first arm for rotating the first and second arm to cause the second portion to move between the folded condition and the deployed condition.

9. The aircraft recited in claim 1, wherein each linkage comprises:
a plurality of first arms pivotably connected to the first and second portions; and
a plurality of second arms pivotably connected to the first and second portions and rotatably connected to the first arms, wherein the actuator is a rotary actuator secured to one of the first arms for rotating the first and second arms to cause the second portion to move between the folded condition and the deployed condition.

10. The aircraft recited in claim 1, wherein the first and second portions are free of a cove door.

11. The aircraft recited in claim 1 wherein the actuator comprises a pair of actuators synchronized together by a common shaft.

12. A wing fold mechanism for an aircraft having a wing extending along a span wise centerline and including first and second portions that cooperate to define an interior space, the wing fold mechanism comprising:
at least one linkage for connecting the first portion to the second portion, each linkage comprising:
a first arm configured for pivotable connection the first and second portions; and
a second arm rotatably connected to the first arm and configured for pivotable connection to the first and second portions,
a linear actuator connected to the first arm of the at least one linkage for moving the second portion relative to the first portion, wherein the second portion is movable between a folded condition extending at an angle relative to the first portion and exposing the interior space and a deployed condition coextensive with and abutting the first portion to form a seam that completely encircles the span wise centerline so as to completely enclose the wing fold mechanism within the interior space.

13. The wing fold mechanism recited in claim 12, wherein each linkage comprises one or more additional arms rotatably connected together about an axis and configured to be pivotably connected to the first portion and the second portion.

14. The wing fold mechanism recited in claim 12, wherein the first and second portions are free of a cove door.

15. A wing fold mechanism for an aircraft having a wing extending along a span wise centerline and including first and second portions that cooperate to define an interior space, the wing fold mechanism comprising:
at least one linkage for connecting the first portion to the second portion, each linkage comprising:
a plurality of first arms configured for pivotable connection to the first and second portions; and
a plurality of second arms rotatably connected to the first arms and configured for pivotable connection to the first and second portions; and
a rotary actuator connected to one of the first arms of the at least one linkage for moving the second portion relative to the first portion, wherein the second portion is movable between a folded condition extending at an angle relative to the first portion and exposing the interior space and a deployed condition coextensive with and abutting the first portion to form a seam that completely encircles the span wise centerline so as to completely enclose the wing fold mechanism within the interior space.

16. A method of folding and unfolding a wing of an aircraft having first and second portions and extending from the aircraft along a span wise centerline, the wing further having a plurality of brackets secured to the first and second portions and including a plurality of notches, the method comprising:
providing a wing fold mechanism comprising:
at least one linkage; and
an actuator connected to at least one linkage,
connecting the at least one linkage to the first portion and the second portion; and
actuating the actuator to rotate the at least one linkage about a plurality of hydraulic swivels each pivotably connected to one of the brackets on each of the first and second portions to move the second portion from a folded condition extending at an angle relative to the first portion and exposing the interior space to a deployed condition coextensive with and abutting the first portion to form a seam that completely encircles the span wise centerline so as to completely enclose the wing fold mechanism within the interior space, the notches cooperating to enclose a portion of each hydraulic swivel when the second portion is in the deployed condition.

* * * * *